United States Patent [19]
Blomgren et al.

[11] 4,400,453
[45] Aug. 23, 1983

[54] NON-AQUEOUS ELECTROCHEMICAL CELL

[75] Inventors: George E. Blomgren, Lakewood; Marvin L. Kronenberg, Cleveland Heights, both of Ohio

[73] Assignee: Union Carbide Corporation, Danbury, Conn.

[21] Appl. No.: 439,521

[22] Filed: Feb. 4, 1974

Related U.S. Application Data

[63] Continuation-in-part of Ser. No. 212,582, Dec. 27, 1971.

[51] Int. Cl.$^3$ .............................................. H01M 6/14
[52] U.S. Cl. .................................. 429/196; 429/197; 429/199
[58] Field of Search .......... 136/6 LN, 6 R, 20, 83 R, 136/100 R, 154–155, 137

[56] References Cited

U.S. PATENT DOCUMENTS 3,542,602  11/1970  Gabano ............................... 136/155
3,567,515  3/1971  Maricle et al. .................. 136/6 LN

*Primary Examiner*—Charles F. LeFevour
*Attorney, Agent, or Firm*—Cornelius F. O'Brien

[57] ABSTRACT

The invention relates to the use in a non-aqueous electrochemical cell of an electrolyte comprising a solute dissolved in a solvent which is an oxyhalide of an element of Group V or Group VI of the Periodic Table. The oxyhalide solvent serves the dual function of acting as the solvent for the electrolyte salt and as the active cathode depolarizer of the cell.

44 Claims, 5 Drawing Figures

NON-AQUEOUS ELECTROCHEMICAL CELL

This is a continuation-in-part of application Ser. No. 212,582, filed on Dec. 27, 1971.

This invention relates to electrochemical systems and more particularly relates to the use in primary and secondary non-aqueous electrochemical cells of inorganic liquids which are capable of performing the dual function of being the active cathode depolarizer material for the cell and acting as the solvent for the electrolyte salt.

The development of high energy battery systems requires, among other things, the compatibility of an electrolyte possessing desirable electrochemical properties with highly reactive anode materials, such as sodium and lithium. The use of aqueous electrolytes is precluded in these systems since the anode materials are sufficiently active to react with water chemically. It has therefore been necessary, in order to realize the high energy density obtainable through use of these highly reactive anodes, to turn to the investigation of non-aqueous electrolyte systems.

The term "non-aqueous electrolyte" as used herein refers to an electrolyte which is composed of a solute, such as, for example, a metal salt or a complex salt of Group I-A, Group II-A, or Group III-A elements of the Periodic Table, dissolved in an appropriate non-aqueous solvent. The term "Periodic Table" as used herein refers to the Periodic Table of Elements as set forth on the inside back over of the Handbook of Chemistry and Physics, 48th Edition, The Chemical Rubber Co., Cleveland, Ohio, 1967–1968.

A multitude of solutes is known and many have been suggested for use but the selection of a suitable solvent has been particularly troublesome. The ideal battery electrolyte would comprise a solvent-solute pair which has a long liquid range, high ionic conductivity, and stability. A long liquid range, i.e., high boiling point and low freezing point, is essential if the battery is to operate at other than normal ambient temperatures. High ionic conductivity is necessary if the battery is to have high rate capability. Stability is necessary with the electrode materials, the materials of cell construction, and the products of the cell reaction to provide long shelf life when used in a primary or secondary battery system.

It has recently been disclosed in the literature that certain materials are capable of acting both as an electrolyte carrier, i.e., as solvent for the electrolyte salt, and as the active cathode for a non-aqueous electrochemical cell. U.S. Pat. Nos. 3,475,226; 3,567,515; and 3,578,500 each disclose that liquid sulfur dioxide or solutions of sulfur dioxide and a co-solvent will perform this dual function in non-aqueous electrochemical cells. While these solutions perform their dual function, they are not without several disadvantages in use. Sulfur dioxide is always present and, being a gas at ordinary temperatures, it must be contained in the cell as a liquid under pressure or dissolved in a liquid solvent. Handling and packaging problems are created if the sulfur dioxide is used alone and an additional component and assembly step are necessary if sulfur dioxide is to be dissolved in a liquid solvent. As stated above, a long liquid range encompassing normal ambient temperatures is a desirable characteristic in an electrolyte solvent. Obviously, sulfur dioxide is deficient in this respect at atmospheric pressure.

The present invention is based on the discovery that certain inorganic materials which are liquids at ordinary temperatures are oxidizing materials and can perform the dual function of acting as the electrolyte carrier and sole cathode depolarizer in non-aqueous electrochemical cells.

As used herein, and as disclosed in an article titled "Electrochemical Reactions in Batteries" by Akiya Kozawa and R. A. Powers, in the Journal of Chemical Education—Vol. 49, pages 587 to 591, September 1972 edition, a cathode depolarizer is the cathode reactant and therefore is the material electrochemically reduced at the cathode. The cathode collector is not an active reducible material and functions as a current collector plus electronic conductor to the cathode terminal of a cell. In other words, the cathode collector is a situs for the electrochemical reduction reaction of the active cathode material and the electronic conductor to the cathode terminal of a cell.

A liquid active reducible cathode material (depolarizer) can either be employed by itself in an electrochemical device (i.e., galvanic cell), mixed with a conductive solute which is a non-reactive material but is added to improve conductivity of the liquid active reducible cathode materials, or mixed with both a conductive solute and a non-reactive cosolvent material. A non-reactive cosolvent material is one that is electrochemically inactive and therefore can not function as the active cathode material (depolarizer).

In accordance with the present invention there is provided a non-aqueous electrochemical system comprising an anode, a cathode collector and a cathode-electrolyte of a solute dissolved in a solvent which includes an oxyhalide of a Group V or Group VI element of the Periodic Table. The electrolyte solvent performs the dual function of acting as solvent for the electrolyte salt and as the active cathode depolarizer of the cell. The term "cathode-electrolyte" is used herein to describe materials performing this dual function.

The use of a single component of the cell as both an electrolyte carrier and active cathode depolarizer is a relatively recent development since previously it was generally considered that the two functions were necessarily independent and could not be served by the same material. For an electrolyte carrier to function in a cell, it is necessary that it contact both the anode and cathode depolarizer, forming a continuous ionic path, and it has generally been assumed that the cathode must never directly contact the anode. It would therefore appear that the two functions are mutually exclusive. However, it has recently been discovered that certain active cathode materials such as sulfur dioxide do not react chemically to any appreciable extent with an active anode metal at the interface between the metal and the cathode material, thereby allowing the cathode material to contact the anode directly and act as the electrolyte carrier. While the theory behind the cause of the inhibition of direct chemical reaction is not fully understood at the present time, and applicants do not desire to be limited to any theory of invention, it appears that direct chemical reaction is inhibited either by an inherently high activation energy of reaction or the formation of a thin, protective film on the anode surface. Any protective film on the anode surface must not be formed to such an excess that a large increase in anode polarization results.

The cathode materials of the present invention are believed to inhibit the direct reaction of active anode metal surfaces sufficiently to permit the cathode materials to act as electrolyte carriers but not to an extent such that the performance of the cell is substantially impaired. In this respect the cathode materials of the present invention may act much in the same manner as sulfur dioxide but, being liquids, are not subject to its disadvantages in use.

Figure 1:
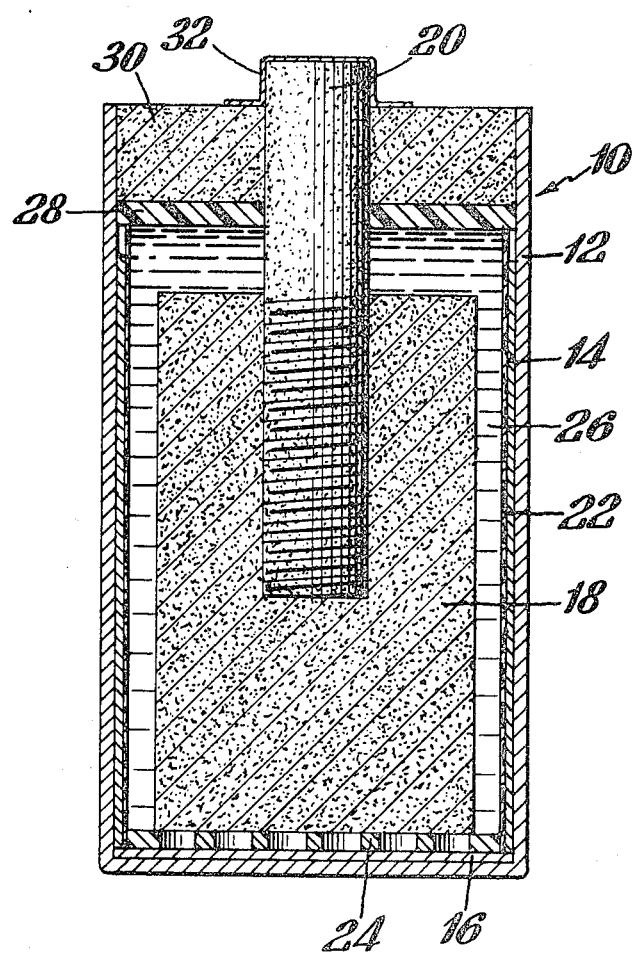
FIG. 1 shows a cross-sectional view of a battery in accordance with one embodiment of the present invention.

Referring in detail to FIG. 1 there is shown a round cell formed and sealed in a metal can and comprising a lithium anode and a cathode-electrolyte of a solute dissolved in a liquid oxyhalide of an element of Group V or Group VI of the Periodic Table.

The round cell, generally designated 10, in FIG. 1, is formed in a cylindrical metal can 12, such as a magnesium can, which is lined with a lithium anode comprising a side wall anode member 14 of a sheet of lithium metal completely encircling the inner circumference of the can 12 and a bottom anode member 16 of a disc of lithium metal at the base of the can 12.

A cathode collector is provided in the center of the can 12 and comprises a cylinder of porous graphite 18 having a graphite rod 20 extending upwardly therefrom. The cathode collector is physically separated from the anode by a two component separator comprising a side wall separator member 22 of a sheet of compacted polypropylene fibres and a bottom separator member 24 of a polytetrafluoroethylene disc having perforations therethrough.

The porous graphite cylinder and the space between the cathode collector and the anode contain a solution 26 of a solute in an oxyhalide of an element of Group V or Group VI of the Periodic Table, e.g., 1 molar lithium aluminum tetrachloride in sulfuryl chloride, which acts as both the active cathode and electrolyte for the cell.

The cell closure consists of a tightly fitting polytetrafluoroethylene disc 28, having a central hole for snugly engaging the graphite rod 20, and a layer of epoxy resin 30 above the polytetrafluoroethylene disc 28 to insure a liquid and gas tight seal. A metal cap 32 crimped over the end of the graphite rod 20 provides external cathode contact and completes the cell.

As stated above, the basic components of the cell of the present invention are an anode, a cathode collector and a cathode-electrolyte consisting of a solute dissolved in a solvent which includes an oxyhalide of a Group V or Group VI element of the Periodic Table.

Useful anode materials are generally consumable metals and include the alkali metals, alkaline earth metals and alloys of alkali metals or alkaline earth metals with each other and other metals. The term "alloy" as used herein and the appended claims is intended to include mixtures; solid solutions, such as lithium-magnesium; and intermetallic compounds such as lithium monoaluminide. The preferred anode materials are the alkali metals and particularly lithium, sodium and potassium.

Any compatible solid, which is substantially electronically conductive and inert in the cell, will be useful as a cathode collector in the cells of the present invention since the sole function of the collector is to permit external electrical contact to be made with the active cathode material.

It is desirable to have as much surface contact as possible between the cathode and the collector. It is therefore preferred to employ a porous collector since it will provide a high surface area interface with the liquid cathode material. The collector may be metallic and may be present in any physical forms such as a metallic film, screen or a pressed powder. Preferably, however, a pressed powder collector will be at least partially of carbonaceous or other high surface area material.

As stated above, the electrolyte of the invention comprises a solute dissolved in a liquid solvent including an oxyhalide of a Group V or Group VI element of the Periodic Table.

The solute may be a simple or double salt which will produce an ionically conductive solution when dissolved in the solvent. Preferred solutes are complexes of inorganic or organic Lewis acids and inorganic ionizable salts. The only requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226—July/December, 1938, pages 293-313 by Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the salt or the resulting ions in situ. On such double salt, for example, is that formed by the combination of aluminum chloride and lithium chloride to yield lithium aluminum tetrachloride.

Useful electrolyte solvents, which additionally act as cathode depolarizers within the system, are oxyhalides of elements of Group V and VI of the Periodic Table. These elements encompass those of Groups V-A, V-B, VI-A and VI-B of the Periodic Table. These oxyhalides are generally liquids at normal temperatures and possess good diffusional and electrochemical properties. The term oxyhalide includes, in addition to simple oxyhalides, such compounds as mixed halides and oxyhalides of combinations of two or more elements from Group V or Group VI of the Periodic Table.

Table I lists a number of oxyhalides which are useful as electrolyte solvents and cathode depolarizers in electrochemical systems. The melting point and boiling point measurements are given at atmospheric pressure unless otherwise indicated. The dielectric constant was measured at 20° C. unless otherwise indicated.

TABLE I
PROPERTIES OF USEFUL OXYHALIDES

| Compound | Melting Point (°C.) | Boiling Point (°C.) | Dielectric Constant |
|---|---|---|---|
| Phosphoryl chloride ($POCl_3$) | 1.3 | 108 | 13.9 |
| vanadyl trichloride ($VOCl_3$) | −79.5 | 127 | 3.4(21° C.) |
| vanadyl tribromide ($VOBr_3$) | −59.0 | 130(90 mm) | 3.6 |
| thionyl chloride ($SOCl_2$) | −104.5 | 75.7 | 9.05 |
| thionyl bromide ($SOBr_2$) | −50.0 | 138 | 9.06 |
| sulfuryl chloride ($SO_2Cl_2$) | −54.1 | 69.5 | 9.15 |
| chromyl chloride ($CrO_2Cl_2$) | −96.5 | 116.7 | 2.6 |
| selenium oxychloride ($SeOCl_2$) | 10.0 | 178 | 55.0(25° C.) |

Dielectric constant is a measure of the relative effect of the solvent or the force with which two oppositely charged particles attract each other. Therefore, in an electrolyte solution a high dielectric constant reduces the force between oppositely charged ions, thereby permitting a greater separation between the ions which generally increases the equivalent conductivity of the solution.

It will become apparent that each of the above and similar oxyhalides such as pyrosulfuryl chloride, selenium oxyfluoride, etc., which are liquids at normal ambient temperatures, will be useful in accordance with the present invention to a greater or lesser degree depending upon the particular combination of cell components. In selecting the particular oxyhalide for a particular cell one should be guided by the data contained in Table I as well as the stability of the particular oxyhalide in the presence of the other cell components and operating temperatures at which the cell is expected to perform. For example, phosphoryl chloride will not react with alkali metals even at 100° C. Vanadyl trichloride can be boiled with sodium for 12 hours at ambient pressure with no reaction. Vanadyl tribromide will normally decompose at room temperature but is stable in a sealed vessel. Selenium oxychloride, which has an unusually high dielectric constant, will not attack sodium even at the boiling point of selenium oxychloride. The particular oxyhalide employed can therefore be selected with regard to the other cell components, constructional features and expected operating conditions to provide optimum performance.

If desired, a co-solvent may be added to the oxyhalide compound to alter the dielectric constant, viscosity or solvent properties of the liquid to achieve better conductivity. Any of a number of organic liquids could be used for this purpose. Particularly preferred are propylene carbonate, nitrobenzene, and dimethyl sulfoxide which are non-reactive cathode co-solvents.

In addition, if it is desired to render the electrolyte solution more viscous or convert it into a gel, a gelling agent such as colloidal silica may be added.

The following examples are illustrative of the present invention and are not intended, in any manner, to be limitative thereof.

EXAMPLE 1

A D-size round cell was constructed in a magnesium can which also acted as the anode collector. The inside wall and bottom of the can were lined with lithium sheet weighing 2.4 grams which was the active anode. The cathode collector consisted of a cylinder of porous graphite threaded at the top and attached to a solid graphite rod serving as the external cathode current collector. A layer of polypropylene filter sheet served to electrically insulate the anode walls from the graphite cylinder. A perforated polytetrafluoroethylene disc was placed at the bottom of the cell to give further physical separation between the graphite cylinder and the lithium sheet. The cell was completed by adding 19 milliliters of a 1 molar solution of lithium aluminum tetrachloride in sulfuryl chloride and sealing the cell at the top with a polytetrafluoroethylene cap. The sulfuryl chloride acted both as a soluble cathode depolarizer and as a solvent for the lithium aluminum tetrachloride electrolyte salt. The cell delivered 5 ampere-hours at an average voltage of 2.3 volts. This discharge represents a watt-hour figure of 11.5. The open circuit voltage for the cell was 3.60 volts.

EXAMPLE 2

A cell similar to that of Example 1 was constructed in a nickel-plated steel can and employed a lithium anode and an electrolyte of 1 molar lithium aluminum tetrachloride in thionyl chloride. The cell was discharged at an average current of 60 milliamperes and delivered 1.56 ampere-hours at an average voltage of 2.2 volts. The discharge voltage after 8 days on this load was still 2 volts. The open circuit voltage was 3.54 volts.

EXAMPLE 3

A cell similar to that of Example 1 was fabricated in a magnesium can with a lithium liner as the anode and employed an electrolyte of one molar lithium aluminum tetrachloride in thionyl bromide. The cell was discharged at a 60 milliampere drain and delivered 2.17 ampere-hours at an average voltage of 2.3 volts. The open circuit voltage for this cell was 3.65 volts.

EXAMPLE 4

A D-size round cell was prepared employing a magnesium can anode, a porous graphite cathode collector, a polypropylene separator, and a cathode-electrolyte system of 1 molar lithium aluminum tetrachloride in thionyl chloride. This cell functioned for 6½ days on a 10 milliampere drain during which time the voltage range from an initial closed circuit voltage of 1.36 down to 0.78 volts at the end of that period. The open cicuit voltage of this cell was 1.56 volts.

EXAMPLE 5

A test cell was assembled in which the cathode-electrolyte solution was placed in a glass container. A piece of lithium sheet serving as the anode and a small porous graphite block serving as the cathode collector were suspeded in the electrolyte with provision for external electrical contact to these electrodes after the cell was sealed. The electrodes were spaced about 2 centimeters apart and each had a total surface area of 11 square centimeters of which about 6-8 square centimeters was immersed in the electrolyte. Such a cell utilizing a lithium anode and appoximately 30 milliliters of a 1 molar solution of lithium aluminum tetrachloride in sulfuryl chloride functioned for 9 days on a 10 milliampere drain and delivered 2.16 ampere-hours. The initial closed circuit voltage was 3.4 volts and at the termination of the test the voltage was 1.6 volts.

EXAMPLE 6

A glass test cell similar to that described in Example 5 was prepared employing an electrolyte of 5 milliliters of chromyl chloride mixed with 30 milliliters of a 1 molar solution of lithium aluminum tetrachloride in nitorbenzene. Nitrobenzene was used as a co-solvent for the chromyl chloride since lithium aluminum tetrachloride is substantially insoluble in chromyl chloride and the mixture of chromyl chloride and nitrobenzene displayed an electrical resistance which was much lower than chromyl chloride liquid alone. This cell was discharged at 25 milliamperes and delivered 0.17 ampere-hour at an average voltage of 3.4 volts. The cell discharged on the 25 milliampere drain for 7 hours at above 2.0 volts. Its open circuit voltage was 4.1 volts.

EXAMPLE 7

A glass test cell similar to that of Example 5 was constructed employing a cathode-electrolyte combination of a 1 molar lithium aluminum tetrachloride solution in phosphoryl chloride. On a ten milliampere drain, the cell delivered 0.42 ampere-hour. The voltage on load was 2.25 volts initially and 1.0 volt after 42 hours. The open circuit voltage for the cell was 3.0 volts.

EXAMPLE 8

A flat-type cell was constructed utilizing a metal base having a shallow depression in which the cell contents were placed and a metal cap for sealing the cell. The contents consisted of a 5 square centimeter lithium anode disc, 5 milliliters of a 1 molar lithium aluminum tetrachloride solution in sulfuryl chloride, a 0.05 inch thick porous cathode collector made of compressed conductive carbon and a polypropylene separator. The total thickness of the anode, cathode collector, and separator was about 0.2 centimeter. On a 10 milliampere drain, this cell delivered 0.4 ampere-hour at 3.5 volts. The cell had an open circuit voltage of 3.8 volts and discharged continuously at 3.5 volts for 36 hours.

EXAMPLE 9

A flat cell substantially the same as that of Example 8 but employing thionyl bromide as the cathode and electrolyte solvent was discharged at a steady 3.4 volts for 32 hours on a 10 milliampere drain. The open circuit voltage for the cell was 3.5 volts.

EXAMPLE 10

A flat cell similar to that of Example 8 was fabricated with a lithium monoaluminide anode (about 15 weight percent lithium) and a 1 molar solution of lithium aluminum tetrachloride in thionyl chloride. This cell discharged for 31 hours on a 10 milliampere drain for a total capacity of 0.315 ampere-hour or 0.82 watt-hour to a 1.0 volt cutoff. The open circit voltage was 3.2 volts.

EXAMPLE 11

A glass test cell was prepared using a 0.5 millimeter thick lithium metal anode and a 0.5 millimeter thick polytetrafluoroethylene-carbon mixture as cathode collector and a polypropylene filter sheet as a separator. The electrodes, each of which had an apparent surface area of 12.8 square centimeters, were immersed in an ecxess of cathode-electrolyte consisting of 0.8 molar lithium aluminum tetrachloride in sulfuryl chloride. A summary of the discharge data obtained in a heavy current pulsing test at various loads is shown in Table II:

TABLE II

PULSE DATA FOR Li—$SO_2Cl_2$ CELL

| Load (ohms) | Load Duration (seconds) | Cell Voltage (volts) |
|---|---|---|
| 25.00 | 0.1 | 3.40 |
| 12.50 | 0.1 | 3.10 |
| 6.25 | 0.1 | 2.50 |
| 3.33 | 0.1 | 2.00 |
| 1.66 | 0.1 | 1.35 |
| 1.25 | 0.1 | 1.10 |
| 25.00 | 1.5 | 3.40 |
| 6.25 | 1.5 | 2.50 |
| 3.33 | 1.5 | 1.96 |
| 1.66 | 1.5 | 1.34 |
| 12.50 | 1.0 | 3.03 |

EXAMPLE 12

A cell of the type described in Example 5 was assembled with a lithium anode (0.18 gram; 9 square centimeter surface area), a porous graphite cathode collector, a polypropylene separator, and a cathode-electrolyte system of 50 milliliters of a 1 molar lithium aluminum tetrachloride solution in thionyl chloride immobilized with 2.7 grams of colloidal silica. The open circuit voltage of the cell was 3.56 volts. On a 10 milliampere drain, the cell voltage ranged from about 2.9 to about 2.4 volts over a 25 hour discharge period.

EXAMPLE 13

A cell of the type described in Example 5 was assembled with a lithium-magnesium alloy anode (53 percent by weight magnesium), a porous graphite cathode collector, and a cathode-electrolyte system of 50 milliliters of a 1 molar lithium aluminum tetrachloride solution in thionyl chloride. The cell was discharged at 5 milliamperes for 26 hours. The cell voltage fluctuated during discharge but averaged about 1.1 volts.

EXAMPLE 14

A flat cell of the type described in Example 8 was assembled with a lithium anode and a cathode-electrolyte system of 1.0 molar antimony pentachloride in thionyl chloride. This cell was discharged on a 10 milliampere drain for a total capacity of 0.045 ampere-hour from an initial 4.0 volts on closed circuit to a 1.0 volt cutoff. The open circuit voltage was 4.16 volts.

EXAMPLE 15

A flat cell of the same construction as that of Example 8 was assembled with a lithium anode and a solution of 1.0 molar aluminum trichloride and 1.0 molar lithium sulfide in phosphoryl chloride as the cathode-electrolyte system. This cell was discharged on a 5.0 milliampere drain for a total of 0.265 ampere-hour to a 1.0 volt cutoff. Open circuit voltage was 3.2 volts.

EXAMPLE 16

A flat cell of the same construction as that of Example 8 was assembled with a lithium anode and a solution of 1.0 molar lithium chloride and 1.0 molar zirconium tetrachloride in thionyl chloride as the cathode-electrolyte system. The cell was discharged on a 10 milliampere drain for a total of 0.065 ampere-hour to a 1.0 volt cutoff. The open circuit voltage was 3.8 volts.

EXAMPLE 17

A glass test cell was assembled with a cathode collector consisting of a 12 inch square nickel screen and a lithium anode of 6 layers of 8.7 inch by 2 inch lithium sheet. These electrodes were separated with a sheet of polypropylene filter paper and rolled up in a jelly-roll fashion with the lithium anode on the outside of the rolled assembly. The electrodes were immersed in a cathode-electrolyte system consisting of 200 milliliters of 1 molar lithium aluminum tetrachloride in thionyl chloride, gelled with 3.5 weight percent colloidal silica and conductive carbon. On a 50 milliampere drain, the cell ran for about 185 hours at above 2.0 volts and delivered at total of 12 ampere-hours to a 1.0 volt cutoff. The open circuit voltage was 3.88 volts.

EXAMPLE 18

A round cell similar to that of Example 1 was constructed with a magnesium can as the cell container and anode collector and a 2.9 gram lithium sheet liner as the anode. A porous graphite cathode collector was employed with a cathode-electrolyte system consisting of 32 milliliters of a 1 molar solution of lithium aluminum tetrachloride in sulfuryl chloride to which sufficient activated carbon powder had been added to produce a thick paste. Cell open circuit voltage was 3.89 volts. On a 50 milliampere drain, the cell discharged for 60 hours three above 3 volts and delivered a total of 3.6 ampere-hours to a 1.0 volt cutoff.

EXAMPLE 19

A glass test cell similar to that of Example 5 was constructed with a sodium anode having a surface area of about 10 square centimeters, a porous graphite cathode collector, and a cathode-electrolyte system of 100 milliliters of a solution of 1 molar sodium chloride and 1 molar aluminum chloride in sulfuryl chloride. On a 10 milliampere drain, the cell operated for 6.5 hours above 2.0 volts to a cutoff voltage of 1.0 volt in a total of 9.2 hours. Open circuit voltage was 3.66 volts.

EXAMPLE 20

A glass test cell similar to that of Example 5 was assembled with a potassium anode of about 10 square centimeters surface area and about 70 milliliters of a cathode-electrolyte of 1 molar potassium chloride and 1 molar aluminum chloride in thionyl chloride. Open circuit voltage of this cell was 3.90 volts. On a 10 milliampere drain the cell operated for 31 hours at above 2.0 volts and a total of about 37 hours to a 1.0 volt cutoff.

EXAMPLE 21

A glass test cell similar to that of Example 5 was assembled with a sodium metal anode having a surface area of 10 square centimeters and a cathode-electrolyte of 20 milliliters of a solution of 1 molar sodium chloride and 1 molar aluminum chloride in phosphoryl chloride. The open circuit voltage of this cell was 3.04 volts. On a 5 milliampere drain, the cell operated for 11.5 hours to a 1.0 volt cutoff.

EXAMPLE 22

A glass test cell similar to that of Example 5 was assembled with a lithium metal anode. The cathode-electrolyte was a solution of 1 molar lithium aluminum tetrachloride in 30 milliliters of phosphoryl chloride to which was added 20 milliliters of vanadyl trichloride. The open circuit voltage of this cell was 4.04 volts. On a 20 milliampere drain, the cell operated for 16½ hours from an initial 3.3 volts to a 1.0 volt cutoff.

From the above it will be obvious that the present invention offers a versatility in the fabrication of nonaqueous cells which has been lacking in cells based on the use of separate cathodes and electrolyte solvents. It additionally overcomes many of the disadvantages of systems which werr previously available employing combined cathode-electrolyte solvents since the materials of the present invention are liquids at normal ambient temperature, i.e., about 25° C., and can therefore be more easily handled than materials which are gases at this temperature.

It will also be obvious that, while the present invention has been set forth in considerable detail, it is nevertheless susceptible to modifications and variations within the scope of the invention. Such modifications would include, but are not limited to, variations in the type of cell construction, optimization amounts of solute and the manner of their addition, etc.

EXAMPLE 23

To test the cathode reduction of $SO_2$ (sulfur dioxide), $SO_2Cl_2$ (sulfuryl chloride) and $SOCl_2$ (thionyl chloride) when used as the active cathode material of a cell, three test cells were produced each having a lithium reference electrode, a carbon cathode (collector) and the following cathode-electrolyte:

Cell A—1 Vol % of $SO_2$ in gamma-butyrolactone ($\gamma$BL) containing 1 M $LiAlCl_4$.

Cell B—50 Vol % of $SOCl_2$ in gamma-butyrolactone ($\gamma$BL) containing 1 M $LiAlCl_4$.

Cell C—10 Vol % $SO_2Cl_2$ in gamma-butryolactone ($\gamma$BL) containing 1 M $LiAlCl_4$.

The cathode reduction of the active cathode material in each of the cells was examined using the stationary electrode polarography method (voltammetry with linearly varying potential) as theoretically described in an article in Analytical Chemistry, Vol. 36, No. 4, April 1964 (Pages 706–723) titled "Theory of Stationary Electrode Polarography" by Richard S. Nicholson and Irving Shain. Using stationary electrodes, the voltage applied to each cell was swept 120 mv/min from about +4 volts to about +1 volt thereby producing a potential scan of the cell which was plotted as a polarogram. The presence of peaks or other curve shapes on the polarogram indicates that the cathodic reaction has occurred and the location of these peaks was used to identify the material undergoing the reaction.

Figure 2:
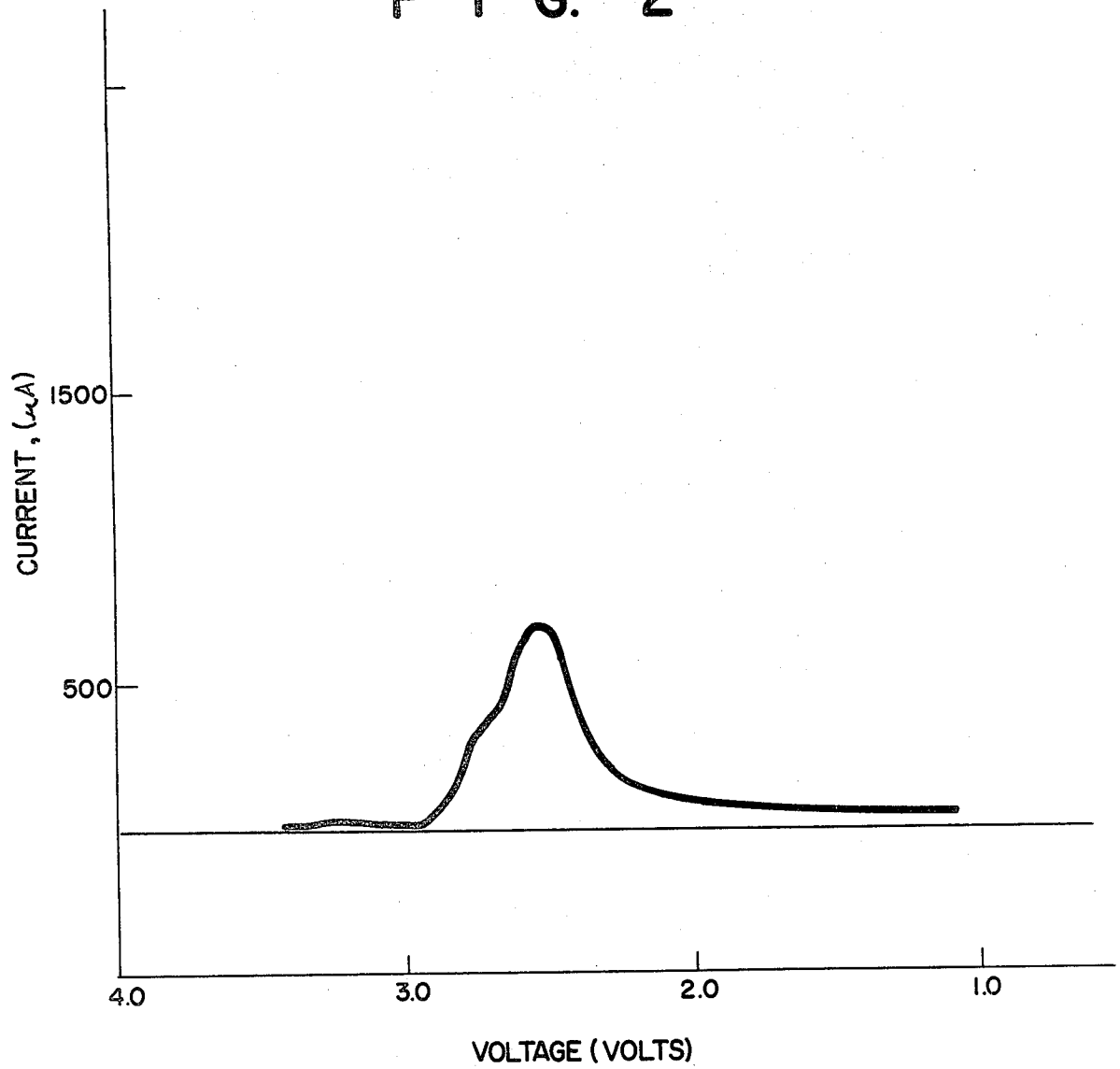
FIG. 2 is a polarogram of a cell employing $SO_2$ as the active cathode material.

FIG. 2 is the polarogram for Cell A and shows the cathodic reaction of $SO_2$ starting at about +3 volts and substantially ending at +2 volts with a peak at +2.5 volts. The highest current reading of the curve for this cell is about 700 μA.

Figure 3:
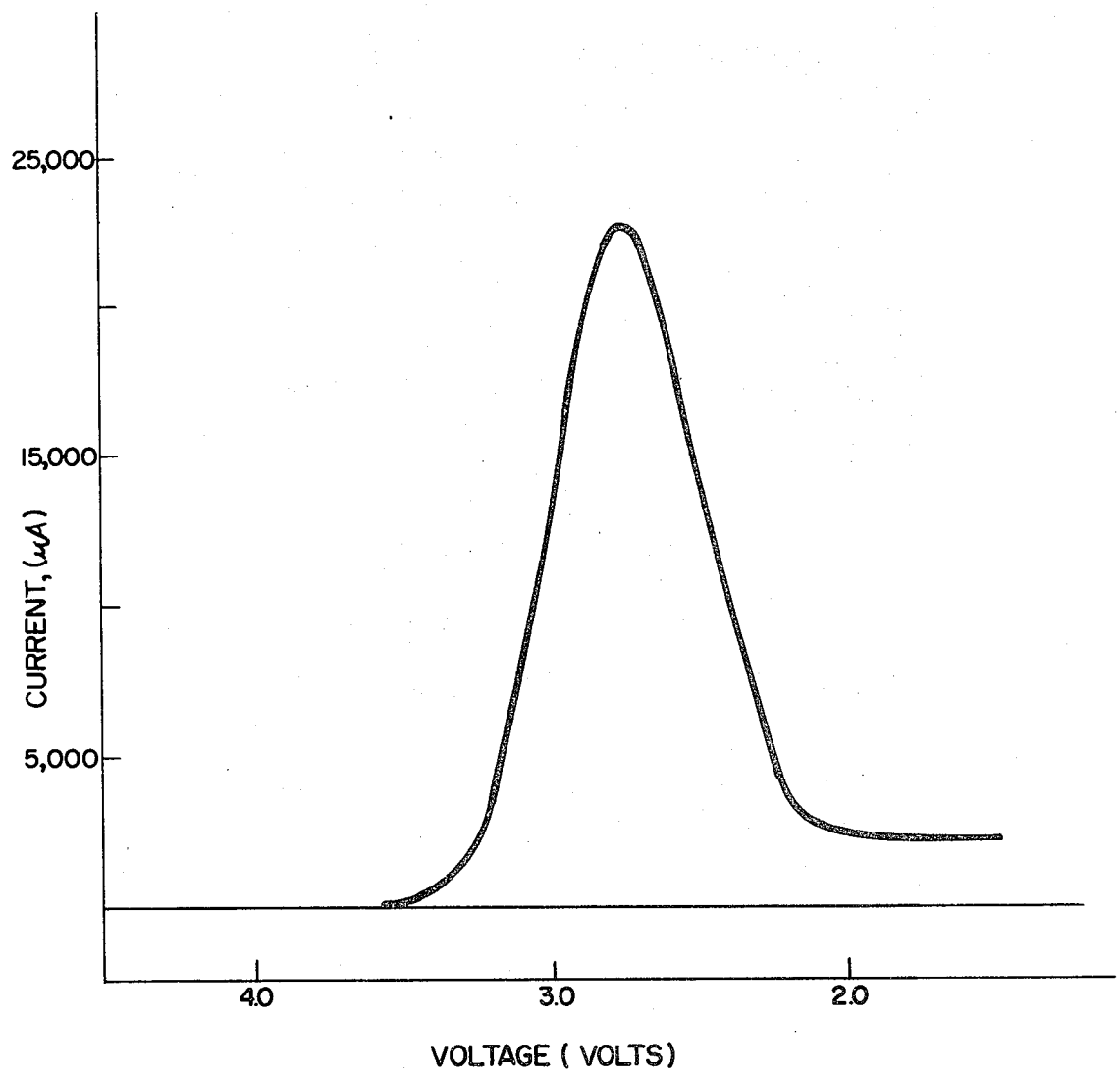
FIG. 3 is a polarogram of a cell employing $SOCl_2$ as the active cathode material.

FIG. 3 is the polarogram for cell B and shows the cathodic reaction of $SOCl_2$ starting at about +3.5 volts and ending below +2 volts with a peak at 2.8 volts. The highest current reading of the curve for this cell is in excess of 20,000 μA.

Figure 4:
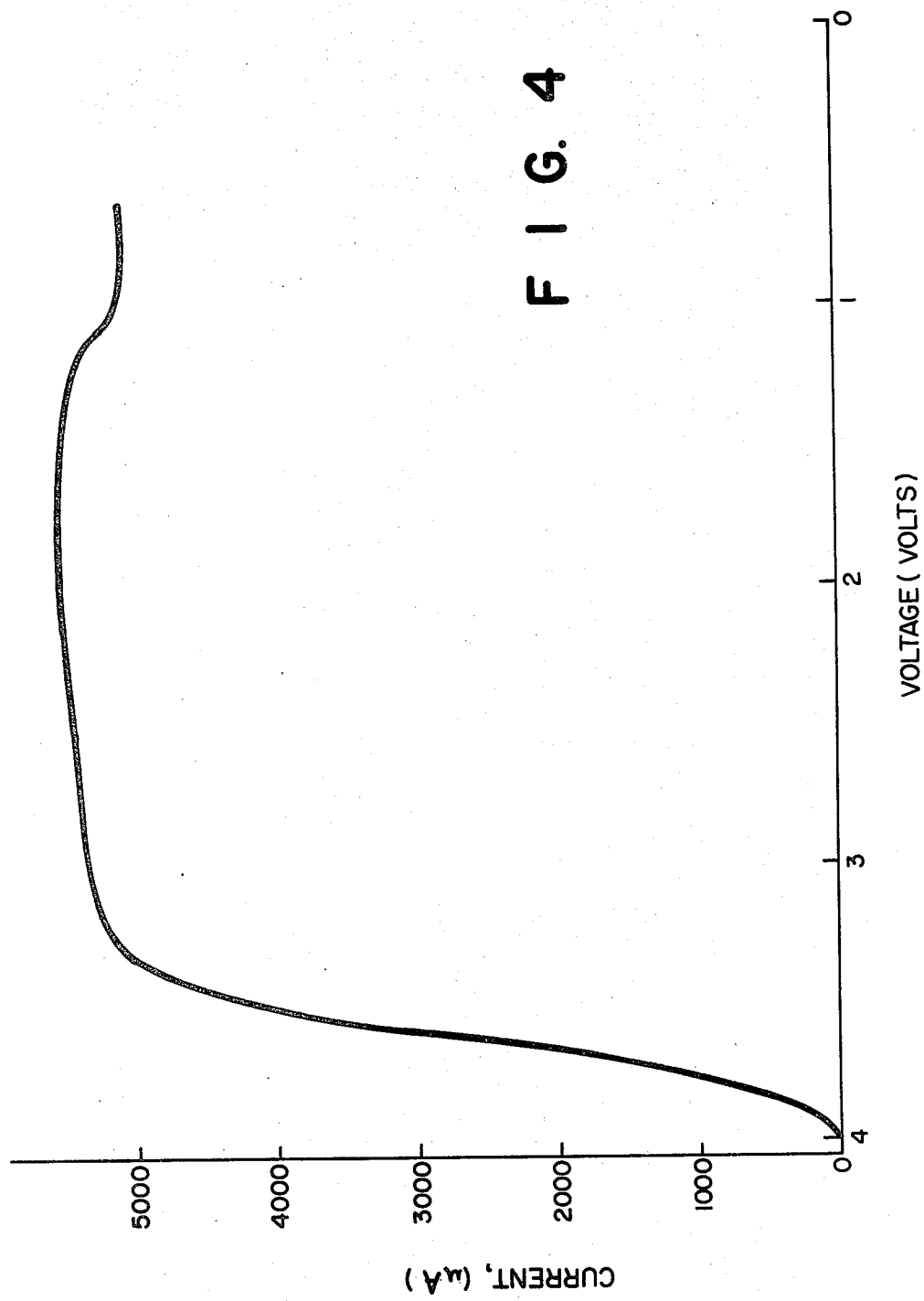
FIG. 4 is a polarogram of a cell employing $SO_2Cl_2$ as the active cathode material.

FIG. 4 is the polarogram for cell C and shows the cathodic reaction of $SO_2Cl_2$ starting at +4 volts, achieving a plateau in current at +3.4 volts and continuing below 30 1 volt. The highest current reading of the curve for this cell is 5000 $\mu A$ which was recorded for the voltage range of from +3.5 volts to +1 volt.

While the peak currents are in accordance with the different concentrations of depolarizer employed in the three cells, the higher peak potentials for the oxyhalides in comparison with $SO_2$ show the superiority of the oxyhalides as the cathode depolarizer as well as the fact that they are electrochemically different materials in addition to their chemical and physical differences.

EXAMPLE 24

A first cell was prepared as in Example 23 except that the cathode-electrolyte was the oxyhalide $POCl_3$ in 1.63 M $LiAlCl_4$. A second test cell was prepared identical to the first test cell except the cathode-electrolyte was saturated with $SO_2$. Using the stationary electrode polarography method as in Example 23, a polarogram was prepared for each of the test cells.

Figure 5:
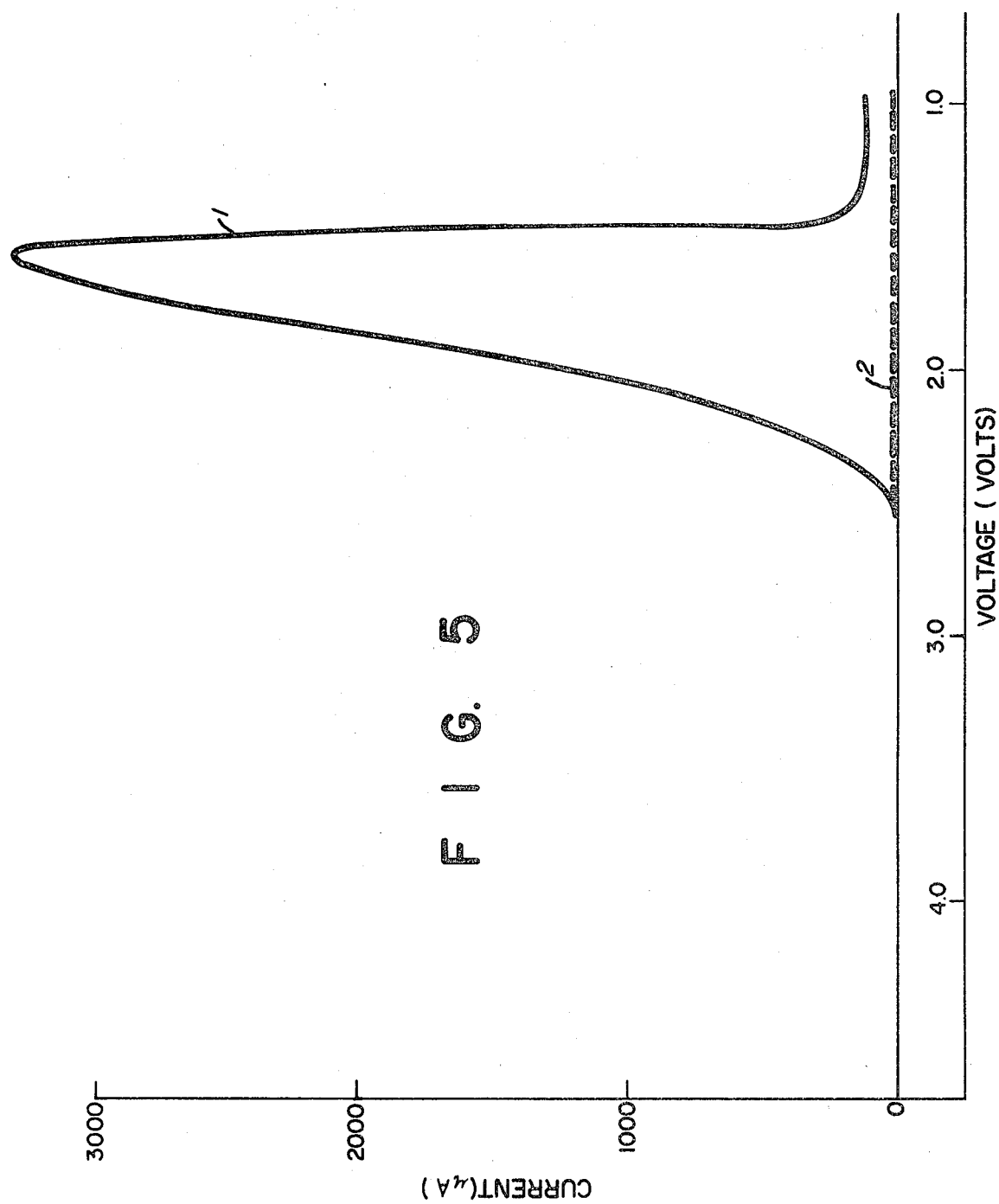
FIG. 5 is a polarogram of a first cell employing $POCl_3$ as the active cathode material and a second cell employing $POCl_3$ and $SO_2$ as the active cathode materials.

In FIG. 5 the curve identified by the number 1 is the polarogram for the test cell without $SO_2$ and it shows cathodic reduction of the oxyhalide $POCl_3$ starting at about +2.5 volts and continuing to about +1.4 volts with the highest current reading for the curve exceeding 3000 $\mu A$. The curve identified by the number 2 in FIG. 5 is the polarogram for the test cell containing $SO_2$ and it shows that when $SO_2$ is combined with the oxyhalide $POCl_3$ there is no electrochemical activity. Thus this test shows that when using the oxyhalide $POCl_3$ alone there is electrochemical activity, while the addition of $SO_2$ to $POCl_3$ suppresses the electrochemical activity for some reason we do not fully understand.

EXAMPLE 25

A first C-size cell was prepared using a lithium anode, a carbon cathode (collector) and a cathode-electrolyte of $SO_2Cl_2$ in 1 M $LiAlCl_4$. A second C-size cell was prepared in a similar manner except that the active cathode material was $SOCl_2$ instead of $SO_2Cl_2$. A third C-size cell was obtained commercially from Electronics Division, Chromalloy: said cell was a lithium cell (Part Number 950/195) employing a $SO_2$ cathode-electrolyte with a lithium bromide (LiBr) salt.

Each of the cells was discharged across a low rated resistor until a cut-off voltage of 2.5 was recorded. The data obtained from the tests are shown in Table II and clearly indicates that the overall power and energy output of the cells using the oxyhalide cathode-electrolyte were far superior to the cell using the $SO_2$ cathode-electrolyte. For example, the open circuit voltage, and average discharge voltage to cut-off (2.5 volts) of the $SO_2$ cell were substantially lower than the open circuit voltage and average discharge voltage to cut-off for the oxyhalide cells.

TABLE III

| C-Size Cell (active cathode) | Open-circuit Voltage (volts) | Fixed Load (ohms) | Discharge Time (hours) | Average Discharge to cut-off (2.5V) Voltage (volts) | Current (ma) |
|---|---|---|---|---|---|
| $SO_2Cl_2$ | 3.91 | 10 | 16.5 | 3.20 | 320 |
| $SOCl_2$ | 3.63 | 10 | 11.6 | 3.29 | 329 |
| $SO_2$ | 2.99 | 11 | 8.4 | 2.60 | 236 |

What is claimed is:

1. A non-aqueous electrochemical cell comprising an anode, a cathode collector and a cathode-electrolyte, said cathode-electrolyte consisting of an ionically conductive solution of a salt dissolved in an active cathode depolarizer wherein the sole active cathode depolarizer is a liquid oxyhalide of an element of Group V or Group VI of the Periodic Table or mixtures thereof.

2. The non-aqueous electrochemical cell of claim 1 wherein said oxyhalide is selected from the group consisting of phosphoryl chloride, vanadyl trichloride, vanadyl tribromide, thionyl bromide, thionyl chloride, sulfuryl chloride, pyrosulfuryl chloride, chromyl chloride, selenium oxychloride and selenium oxyfluoride.

3. The non-aqueous electrochemical cell of claim 1 wherein the cathode collector is a high surface area carbon.

4. The non-aqueous electrochemical cell of claim 1 wherein the cathode collector is a high surface area carbon mixed with polytetrafluoroethylene.

5. A non-aqueous electrochemical cell comprising an anode, a cathode collector and a cathode-electrolyte, said cathode-electrolyte consisting of an ionically conductive solution of a salt dissolved in an active cathode depolarizer and an organic co-solvent wherein the sole active cathode depolarizer is a liquid oxyhalide of an element of Group V or Group VI of the Periodic Table or mixtures thereof.

6. The non-aqueous electrochemical cell of claim 5 wherein said co-solvent is selected from the group consisting of propylene carbonate and nitrobenzene.

7. The non-aqueous electrochemical cell of claim 6 wherein said oxyhalide is selected from the group consisting of phosphoryl chloride, vanadyl trichloride, vanadyl tribromide, thionyl bromide, thionyl chloride, sulfuryl chloride, pyrosulfuryl chloride, chromyl chloride, selenium oxychloride and selenium oxyfluoride.

8. An electrochemical cell consisting essentially of an oxidizable active anode material; a solid, non-consumable, electrically conducting, inert cathode current collector; said anode material being more electropositive than said cathode current collector and thus said anode material is oxidized during operation of said cell; and an electrolytic solution between and in contact with said anode and said cathode current collector, said electrolytic solution consisting essentially of a liquid, electrochemically reducible, covalent inorganic oxyhalide solvent and a solute dissolved therein, said inorganic solvent being the sole oxidant material and sole solvent material in said electrolytic solution; said inorganic solvent being electrochemically reduced upon the surface of said cathode current collector, whereby said inorganic solvent in conjunction with said oxidizable anode material serves as a source of electrical energy during operation of said cell.

9. The electrochemical cell of claim 8 wherein said active anode material is lithium.

10. The electrochemical cell of claim 8 wherein said active anode material is sodium.

11. The electrochemical cell of claim 8 wherein said inorganic solvent includes at least one oxyhalide of phosphorus, sulfur or selenium.

12. The electrochemical cell of claim 8 wherein said inorganic solvent is selected from the group consisting of phosphorus oxychloride, thionyl chloride, thionyl bromide, sulfuryl chloride, selenium oxychloride, and mixtures thereof.

13. The electrochemical cell of claim 8 wherein said inorganic solvent is thionyl chloride or sulfuryl chloride.

14. The electrochemical cell of claim 8 wherein said inorganic solvent is phosphorus oxychloride.

15. The electrochemical cell of claim 8 wherein said solute provides at least one anion having the formula $X^-$, $MX_4^-$, $M'X_6^-$, and $M''X_6^{--}$, where M is an element selected from the group consisting of aluminum and boron; M' is an element selected from the group consisting of phosphorus and antimony; M'' is zirconium; and X is a halogen; said solute further providing at least one cation $SO_2Cl^+$.

16. The electrochemical cell of claim 8 wherein said solute includes at least one compound selected from the group consisting of lithium tetrachloroaluminate, lithium tetrachloroborate, lithium tetrafluoroborate, lithium hexachloroantimonate, and lithium hexachlorozirconate.

17. The electrochemical cell of claim 8 wherein said solute includes a Lewis acid.

18. The electrochemical cell of claim 17 wherein said solute further includes a Lewis base having the general formula $A_mB_n$ where A is an element selected from the group consisting of lithium, sodium, and potassium; B is an element selected from the group consisting of fluorine, chlorine, bromine, and iodine; and m and n are integers.

19. An electrochemical cell consisting essentially of an oxidizable active anode material; a solid, non-consumable, electrically conducting, inert cathode current collector; said anode material being more electropositive than said cathode current collector and thus said anode material is oxidized during operation of said cell; an electrolytic solution between and in contact with said anode material and said cathode current collector, said electrolytic solution consisting essentially of a liquid, electrochemically reducible covalent inorganic oxyhalide solvent and a solute dissolved therein; said inorganic solvent being selected from the group consisting of thionyl bromide, selenium oxychloride, mixtures thereof, and mixtures thereof with phosphorus oxychloride, thionyl chloride or sulfuryl chloride; said inorganic solvent being the sole oxidant material and sole solvent material in said electrolytic solution; said inorganic solvent being electrochemically reduced upon the surface of said cathode current collector, whereby said inorganic solvent in conjunction with said oxidizable anode material serves as a source of electrical energy during operation of said cell.

20. The electrochemical cell of claim 19 wherein said anode material is lithium.

21. An electrochemical cell consisting essentially of an oxidizable active anode material; a solid, non-consumable electrically conducting, inert cathode current collector; said anode material being more electropositive than said cathode current collector and thus said anode material is oxidized during operation of said cell; and an electrolytic solution between and in contact with said anode material and said cathode current collector, said electrolytic solution consisting essentially of a liquid, electrochemically reducible covalent inorganic oxyhalide solvent and a solute dissolved therein; said inorganic solvent comprising phosphorus oxychloride and a cosolvent material selected from the group consisting of thionyl bromide, selenium oxychloride, thionyl chloride or sulfuryl chloride; said inorganic solvent being the sole oxidant material and sole solvent material in said electrolytic solution; said inorganic solvent being electrochemically reduced upon the surface of said cathode current collector, whereby said inorganic solvent in conjunction with said oxidizable anode material serves as a source of electrical energy during operation of said cell.

22. An electrochemical cell consisting essentially of an oxidizable active anode material; a solid, non-consumable, electrically conducting, inert cathode current collector; said anode material being more electropositive than said cathode current collector and thus said anode material is oxidized during operation of said cell; and an electrolyte solution consisting essentially of a liquid, electrochemically reducible, covalent inorganic oxyhalide solvent and a solute dissolved therein, said inorganic solvent being free of sulfur dioxide; said inorganic solvent being electrochemically reduced upon the surface of said cathode current collector, whereby said inorganic solvent in conjunction with said oxidizable anode material serves as a source of electrical energy during operation of said cell.

23. The electrochemical cell of claim 22 wherein said active anode material is lithium.

24. The electrochemical cell of claim 22 wherein said active anode material is sodium.

25. The electrochemical cell of claim 22 wherein said inorganic solvent includes at least one oxyhalide of phosphorus, sulfur or selenium.

26. The electrochemical cell of claim 22 wherein said inorganic solvent is selected from the group consisting of phorphorus oxychloride, thionyl chloride, thionyl bromide, sulfuryl chloride, selenium oxychloride, and mixtures thereof.

27. The electrochemical cell of claim 22 wherein said inorganic solvent is thionyl chloride or sulfuryl chloride.

28. The electrochemical cell of claim 22 wherein said inorganic solvent is phosphorus oxychloride.

29. The electrochemical cell of claim 22 wherein said solute provides at least one anion having the formula $X^-$, $MX_4^-$, $M'X_6^-$, and $M''X_6^{--}$, where M is an element selected from the group consisting of aluminum and boron; M' is an element selected from the group consisting of phosphorus and antimony; M'' is zirconium; and X is a halogen; said solute further providing at least one cation $SO_2Cl^-$.

30. The electrochemical cell of claim 22 wherein said solute includes at least one compound selected from the group consisting of lithium tetrachloroaluminate, lithium tetrachloroborate, lithium tetrafluoroborate, lithium hexachloroantimonate, and lithium hexachlorozirconate.

31. The electrochemical cell of claim 22 wherein said solute includes a Lewis acid.

32. The electrochemical cell of claim 31 wherein said solute further includes a Lewis base having the general formula $A_mB_n$ where A is an element selected from the group consisting of lithium, sodium, and potassnium; B is an element selected from the group consisting of fluorine, chlorine, bromine, and iodine; and m and n are integers.

33. The electrochemical cell of claim 22 wherein one of the products of discharge of said cell is the halide of said anode material, the halogen in said halide originating from said inorganic solvent.

34. An electrochemical cell consisting essentially of an oxidizable active anode material; a solid, non-consumable, electrically conducting, inert cathode current collector; said anode material being more electropositive than said cathode current collector and thus said anode material is oxidized during operation of said cell; and an electrolytic solution consisting essentially of a liquid, electrochemically reducible covalent inorganic oxyhalide solvent and a solute dissolved therein; said inorganic solvent being selected from the group consisting of thionyl bromide, selenium oxychloride, mixtures thereof, and mixtures thereof with phosphorus oxychloride, thionyl chloride or sulfuryl chloride; said inorganic solvent being free of sulfur dioxide; said inorganic solvent being electrochemically reduced upon the surface of said cathode current collector, whereby said inorganic solvent in conjunction with said oxidizable anode material serves as a source of electrical energy during operation of said cell.

35. The electrochemical cell of claim 34 wherein said anode material is lithium.

36. An electrochemical cell consisting essentially of an oxidizable active anode material; a solid, non-consumable electrically conducting, inert cathode current collector; said anode material being more electropositive than said cathode current collector and thus said anode material is oxidized during operation of said cell; and an electrolytic solution consisting essentially of a liquid, electrochemically reducible covalent inorganic oxyhalide solvent and a solute dissolved therein; said inorganic solvent comprising phosphorus oxychloride and a cosolvent material selected from the group consisting of thionyl bromide, selenium oxychloride, thionyl chloride or sulfuryl chloride; said inorganic solvent being free of sulfur dioxide; said inorganic solvent being electrochemically reduced upon the surface of said cathode current collector, whereby said inorganic solvent in conjunction with said oxidizable anode material serves as a source of electrical energy during operation of said cell.

37. The electrochemical cell of claim 36 wherein said anode material is lithium.

38. The electrochemical cell of claim 37 wherein said cosolvent is thionyl chloride or sulfuryl chloride.

39. The electrochemical cell of claim 36 wherein said cosolvent is thionyl chloride or sulfuryl chloride.

40. A non-aqueous electrochemical cell comprising an anode, a porous cathode collector of a carbonaceous material and a cathode-electrolyte, said cathode-electrolyte comprising a solution of an ionically conductive solute dissolved in a liquid active cathode depolarizer wherein said active cathode depolarizer consists of at least one liquid oxyhalide of an element of Group V or Group VI of the Periodic Table and wherein said at least one liquid oxyhalide is the sole active cathode depolarizer.

41. The non-aqueous electrochemical cell of claim 40 wherein said anode is selected from the group consisting of alkali metals, alkaline earth metals, alloys of alkali metals and alloys of alkaline earth metals.

42. The non-aqueous electrochemical cell of claim 40 wherein said oxyhalide is selected from the group consisting of phosphoryl chloride, vanadyl trichloride, vanadyl tribromide, thionyl bromide, thionyl chloride, sulfuryl chloride, pyrosulfuryl chloride, chromyl chloride, selenium oxychloride and selenium oxyfluoride.

43. The non-aqueous electrochemical cell of claim 40 wherein said cathode-electrolyte additionally contains a cosolvent for said solute.

44. A non-aqueous electrochemical cell of claim 40 wherein said anode is lithium and said liquid active cathode depolarizer is thionyl chloride.

* * * * *

UNITED STATES PATENT AND TRADEMARK OFFICE
CERTIFICATE OF CORRECTION

PATENT NO. : 4,400,453
DATED : August 23, 1983
INVENTOR(S) : George E. Blomgren et al It is certified that error appears in the above—identified patent and that said Letters Patent is hereby corrected as shown below:

Column 1, Line 30, delete "over" and substitute therefor --cover--.
Column 4, Line 56, delete "on" and substitute therefor --One--.
Column 6, Line 64, delete "suspeded" and substitute therefor --suspended--.
Column 7, Line 14, delete "nitorbenzene" and substitute therefor
  --nitrobenzene--.
Column 8, Line 4, delete "ecxess" and substitute therefor --excess--.
Column 9, Line 20, delete "at" and substitute --a--.
Column 10, Line 16, delete "werr" and substitute therefor --were--.
Column 11, Line 4, delete "30" and substitute therefor --+--.
Column 11, Line 49, delete "II" and substitute therefor --IV
Column 13, Line 34 (claim 19), after "cell;" add --and--.

Column 14, Line 46 (claim 29), delete "$SO_2Cl^-$" and substitute therefor
  --$SO_2Cl+$--.

Signed and Sealed this

Eleventh Day of December 1984

[SEAL]

Attest:

GERALD J. MOSSINGHOFF

*Attesting Officer*  *Commissioner of Patents and Trademarks*